Figure 1:
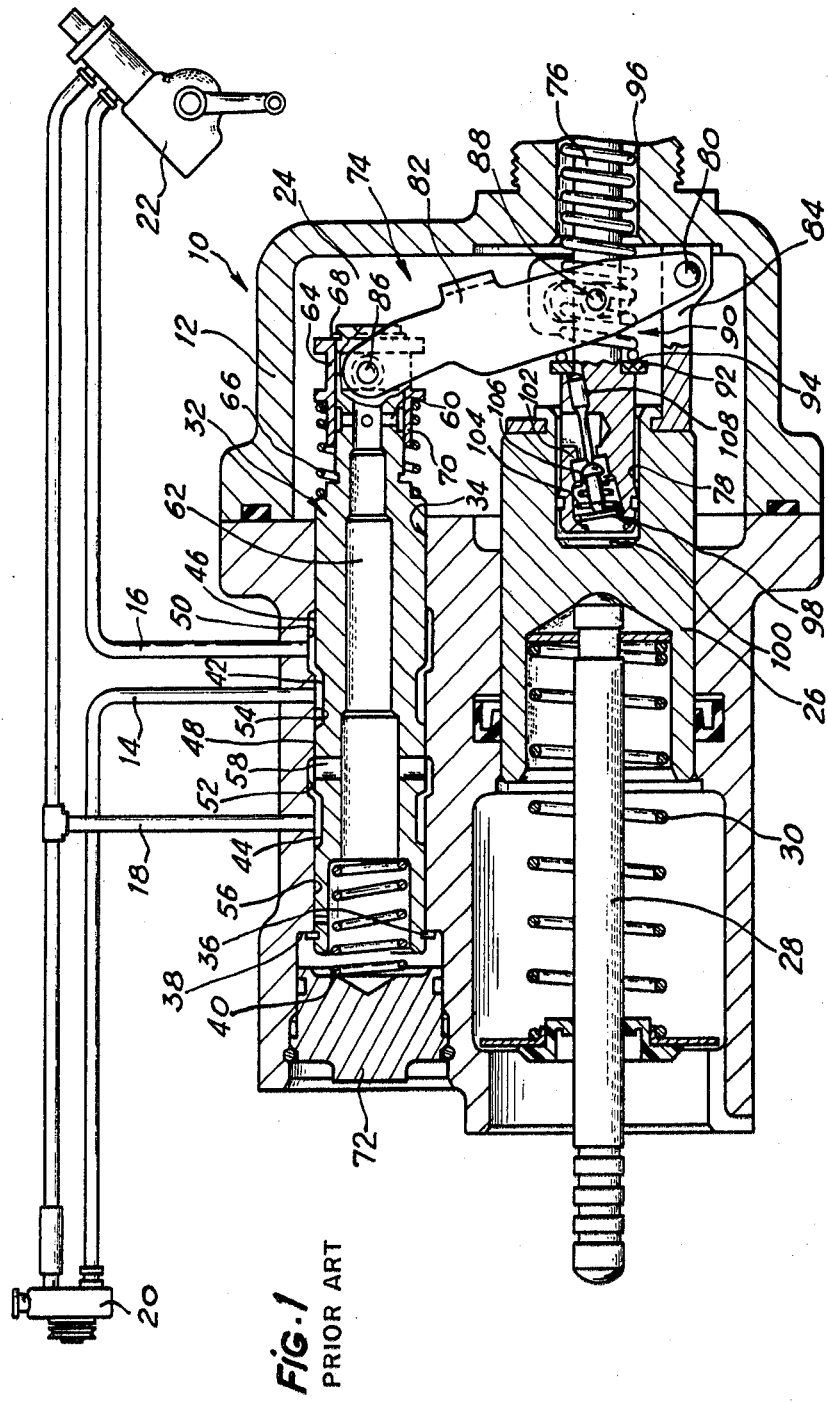

United States Patent [19]

Kervagoret

[11] 4,078,581

[45] Mar. 14, 1978

[54] CONTROL VALVE FOR HYDRAULIC BOOSTER

[75] Inventor: Gilbert Kervagoret, Argenteuil, France

[73] Assignee: Societe Anonyme D.B.A., Paris, France

[21] Appl. No.: 724,434

[22] Filed: Sep. 20, 1976

[30] Foreign Application Priority Data

Oct. 10, 1975 France .................................. 75 31047

[51] Int. Cl.² ........................................... B60T 13/18
[52] U.S. Cl. ................................... 137/627.5; 60/494; 91/450; 137/596.13
[58] Field of Search ............... 60/422, 494; 91/391 R, 91/449, 450, 451; 137/596.13, 627.5

[56] References Cited

U.S. PATENT DOCUMENTS

| | | | |
|---|---|---|---|
| 2,980,066 | 4/1961 | Stelzer et al. | 91/373 |
| 3,633,462 | 1/1972 | Goscenski | 91/450 |
| 3,701,305 | 10/1972 | Lewis et al. | 91/391 X |
| 3,733,968 | 5/1973 | Bach | 91/391 R |

*Primary Examiner*—Robert G. Nilson
*Attorney, Agent, or Firm*—Paul David Schoenle; Ken C. Decker

[57] ABSTRACT

The invention relates to a control valve of a hydraulic booster having an inlet orifice adapted to be connected to a hydraulic pump, an outlet orifice adapted to be connected to an open-center valve, a working orifice connected to the booster pressure chamber and an exhaust orifice connected to the reservoir. The control valve comprises mainly a first and a second valve members respectively controlling fluid connection between the working and the exhaust orifices. The first valve member is secured to a cylinder which partly covers the outlet orifice when this valve member is unseated.

6 Claims, 2 Drawing Figures

CONTROL VALVE FOR HYDRAULIC BOOSTER

The invention relates essentially to a control valve for a hydraulic booster, more particularly for a hydraulic braking booster in a motor vehicle.

British Patent No. 1,425,784 describes a hydraulic booster in which the control valve is of the spool type. More particularly, the valve controls both a continuous flow of fluid from an inlet orifice to an outlet orifice connected to an open-center power steering valve and the alternate connection of a working chamber to either the inlet orifice or a discharge orifice. The spool valve proposed has two disadvantages: its high cost price, and some uncertainty in operation due to the vibration caused by constriction of the passage connecting the inlet orifice to the outlet orifice. An object of the invention is to eliminate both disadvantages by using a control valve of the type having a plurality of valve members.

Control valves for hydraulic boosters of the type having a plurality of valve members are known, more particularly, from U.S. Pat. No. 2,980,066. This patent describes a control valve comprising a casing containing first and second coaxial compartments which are separated by a radial partition and are connected respectively to an inlet orifice and a working orifice, the radial partition having an aperture of which the side adjoining the first compartment comprises a seat on to which a first valve member is resiliently urged, the first valve member being controlled by a tappet of which one end projects through the aperture and the other slides in a fluid-tight manner in the casing and projects into a third compartment in the casing communicating with a discharge orifice, a duct traversing the said other end of the tappet, a second valve member coaxial with the first valve member being associated with a control rod so as to be able successively to close the duct and to move the first valve member off its seat. However, as is clear from the said U.S. patent, this valve, which is of the closed center type, cannot be used in a motor vehicle brake circuit comprising open-center power steering control means with a continuous throughout of fluid.

The invention therefore proposes a control valve for a hydraulic booster having an housing with a pressure chamber therein said valve comprising a casing containing first and second coaxial compartments separated by a radial partition and connected respectively to an inlet orifice and a working orifice, the radial partition having an aperture communicating with both compartments, said aperture opening into said first compartment by the intermediary of a first valve seat, a first valve member resiliently urged toward said seat, tappet means for controlling the said first valve member and having one end projecting through said aperture and the other end slidably mounted in said casing and separating said second compartment from a third compartment connected to an exhaust orifice, a duct traversing said enlarged end and communicating said second and third compartments, said duct opening into said third compartment through the intermediary of a second valve seat, a second valve member in said third compartment to cooperate with said second seat, a control member projecting into said third compartment for successively seat on said second valve member and seat off said first valve member through said tappet means, a cylinder slidably mounted in said first compartment and defining in said first compartment a first cavity and a second cavity, said cylinder having one face supporting said first valve member located in said first cavity and the other face acting as a closure spool to partly cover an outlet orifice opening into said second cavity, and a by-pass passage between said first and second cavities.

Figure 2:
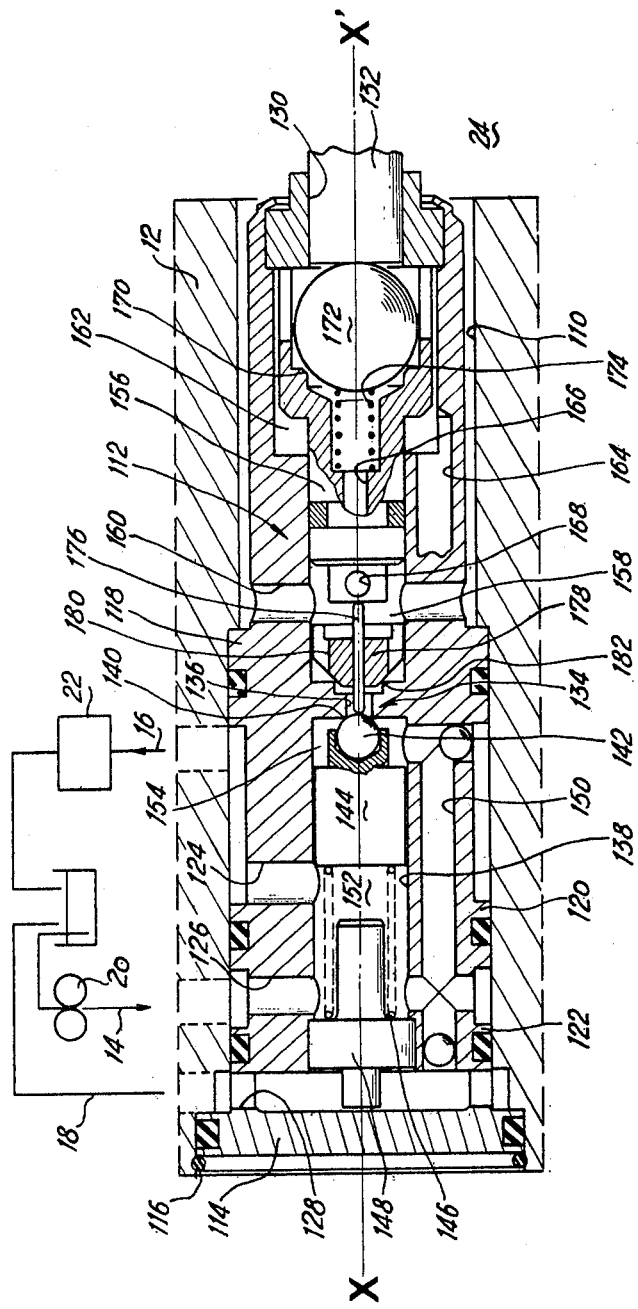

The invention will now be described with reference to the accompanying drawings, in which:

FIG. 1 is a diagrammatic illustration of a vehicle brake circuit comprising a known hydraulic booster as described more particularly in British patent 1,425,784, and FIG. 2 illustrates a cross-section through a control valve embodying the invention, mounted in the body of a hydraulic brake booster of the type shown in FIG. 1.

FIG. 1 represents a brake booster generally designated 10, comprising a body 12 with an inlet orifice 14, an outlet orifice 16 and an exhaust orifice 18. The inlet orifice 14 communicates with the delivery or high-pressure side of the vehicle's power steering pump 20, and the outlet orifice 16 communicates with the inlet or high-pressure side of the vehicle's power steering mechanism 22, which is of the open-center type.

The discharge orifice 18 communicates with a reservoir (not shown) situated at the inlet or low pressure side of the power steering pump 20. The outlet of the power-steering mechanism 22 is also connected to this reservoir. The pump 20 and power-steering mechanism 22 are both conventional devices familiar to those skilled in the automotive art.

The body 12 contains a pressure chamber 24. One end of a booster piston 26 extends into the pressure chamber 24, so that the right-hand end of the piston 26 is exposed to the fluid pressure level prevailing in the chamber 24. The other end of the piston 26 houses one end of an outlet rod 28, whose other end is connected to a conventional automotive master cylinder (not shown) mounted immediately to the left of the booster body 12 in FIG. 1. The rod 28 transmits the motion of the piston 26 to the piston 26 to the left in FIG. 1 to the master cylinder to operate it in conventional manner. A return spring 30 is provided to urge the piston 26 and rod 28 back into the position illustrated, which is the "brakes off" position.

The fluid connection to the pressure chamber 24 is controlled by a spool valve generally designated 32, slidable in a stepped bore generally designated 34. A retaining member 36 mounted on one end of the spool 32 is urged into engagement with a shoulder 38 in the bore 34 by a spring 40, to establish the "off" position of the spool 32 shown in the drawing. The spool 32 is provided with grooves 42, 44 and contact faces 46 which cooperate with corresponding grooves 50, 52 and contact faces 54, 56 in the wall of the bore 34 to control the fluid connection to the pressure chamber 24. The exhaust orifice 18 communicates with the groove 44, the inlet orifice 14 with the groove 42 and the outlet orifice 16 with the groove 50. Radial passages 58, 60 and a longitudinal passage 62, all formed in the spool 32, connect the groove 52 to the pressure chamber 24. A sleeve 64 is slidable on that end of the spool 34 which enters the pressure chamber 24, and a spring 66 resiliently urges the sleeve 64 to the right in FIG. 1 relative to the spool 32, until the end of the sleeve 64 engages on a retaining member 68 mounted on the end of the spool 32.

The sleeve 64 contains apertures 70 which traverse it and enable fluid to pass through the passages 60 when the sleeve is in the position illustrated, but the sleeve 64 prevents fluid from flowing along the passages 60 when it is pushed to the left in FIG. 1 relative to the spool 32. Note that the spring 66 is stronger than the spring 40, so that when a force is exerted on the sleeve 64 to urge it to the left in FIG. 1 the spring 60 prevents relative motion of the sleeve and spool 32, and so causes the spool and sleeve to move in unison until the end of the spool abuts on the plug 72 closing the end of the bore 34, whereupon the spring 66 yields to enable the sleeve to move relative to the spool 32.

The booster is actuated by the control mechanism generally designated 74. The control mechanism 74 has an inlet rod 76 of which the right-hand end (in FIG. 1) is connected to the conventional brake pedal (not shown) installed in the driver's compartment of the vehicle. The left-hand end of the rod 76 is slidably received in a blind bore 78 in the piston 26. A first pivot 80 connects one end of a lever 82 to a projection 84 on the piston 26, and a second pivot 86 connects the other end of the lever 82 to the sleeve 64. A third pivot 88 connects an intermediate point between the ends of the lever 82 to a sleeve 90 slidable on the inlet rod 76. The sleeve 90 ends in an annular shoulder 92 which is urged into engagement with a stop or shoulder 94 on the inlet rod 76 by a spring 96.

A passage generally designated 98 connects a compartment 100 formed between the end of the blind bore 78 and the inlet rod 76 to the pressure chamber 24. A valve seat 102 is provided in the passage 98, and a spring 104 resiliently urges a valve member 106 towards the valve seat 102. The plunger 108 passes through the valve seat 102 and normally connects the valve member 106 to the stop 92 of the sleeve 90. The length of the plunger 108 is such that when the stop 92 is resting on the shoulder 94 the plunger 108 holds the valve member 106 off the valve seat 102, so that fluid can flow substantially unimpeded along the passage 98.

Operation of the booster whose structure have just been described will now be explained.

The various components of the brake booster 10 are shown in the drawing in the position occupied by them when the brakes of the vehicle are off. In this position fluid can flow substantially unimpeded between the inlet orifice 14 and the outlet orifice 16, since the groove 42 communicates with the groove 50. Similarly, because the groove 52 communicates with the groove 44, fluid can flow substantially unhindered between the discharge orifice 18 and pressure chamber 24. When the brakes are applied, the spool 32 is urged to the left in FIG. 1, so that the contact face 48 is covered by the contact face 56 to interrupt the fluid connection between the grooves 44 and 52. At the same time the contact face 48 moves away from the contact face 54, enabling fluid to flow between the groove 52 and the groove 42. Similarly, the orifice formed between the contact face 46 and the contact face 54 is reduced, limiting the fluid flowing between the inlet orifice 14 and outlet orifice 16 and generating in the groove 42 a fluid pressure which is communicated to the groove 52 and pressure chamber 24 by the passages 58, 60 and 62. The fluid pressure in the chamber 24 acts on the right-hand end of the piston 26 and pushes the latter to the left in FIG. 1, so operating the master cylinder in conventional fashion. When the brakes of the vehicle are released, the springs 40, 30 respectively return the spool 32 and piston 26 to the "brakes off" positions illustrated.

Although the booster 10 normally operates entirely satisfactorily, the fluid connection in the booster 10 may be interrupted for various reasons, for example when the engine of the vehicle ceases to operate while the vehicle is moving. When this occurs the flow of pressure fluid to the booster immediately ceases, and the brakes must be applied by mechanical means. When the brakes are applied mechanically, the inlet rod 76 is operated normally and so pushes the spool 32 to the left in FIG. 1 until the end of the spool abuts on the plug 72, whereupon the sleeve 64 moves relative to the spool 32 so that the apertures 60 are covered by the sleeve 64, preventing an abrupt resumption of fluid flow to the booster from stopping the vehicle suddenly. Further motion of the rod 76 moves the shoulder 94 off the stop 92 because the sleeve 90 is forced to move with the lever 82. When the rod 76 is moved relative to the sleeve 90, of course, the spring 96 is compressed. As described above, the length of the plunger 108 is such that the valve member 106 is normally held clear of the valve seat 102, so exhausting the compartment 100 and enabling the inlet rod 76 to move relative to the piston 26. When the abutment 92 moves away from the shoulder 94, the spring 104 urges the valve member 106 and consequently the plunger 108 to the right in FIG. 1, the plunger 108 being in a position to move because the abutment surface 92 is off the plunger. The spring 104 then urges the valve member 106 into fluid-tight engagement with the seat 102, cutting off of fluid between the compartment 100 and pressure chamber 24 and forming a hydraulic seal between the end of the inlet rod 76 and the piston 26, so that the movement of the inlet rod is transmitted directly to the piston 26 for mechanical application of the brakes.

According to the invention the spool valve 32 is replaced with the valve illustrated in FIG. 2. The body 12 contains a stepped bore 110 of which the smaller-diameter end leads directly into the working chamber 24. The casing 112 of the control valve is mounted as a cartridge in the bore 110, where it is held in position between the step in this bore and a plug 114 held in the body 12 by a retaining ring 116. The casing 112 has three bearing surfaces 118, 120, 122 provided with seals to isolate the working chamber 24 from the outlet orifice 124, the outlet orifice 124 from the inlet orifice 126, and the inlet orifice 126 from the exhaust orifice 128. The right-hand end of the casing 112 in FIG. 2 contains an opening 130 into which projects a control rod, which is associated with a sleeve of the type shown at 64 in FIG. 1, connected in turn to the control lever 74. A spring (not shown) is also mounted between the sleeve and the rod 132.

The casing 112 contains two compartments separated by a radial partition 134. The radial partition 134 contains an axial aperture 136. The first compartment, shown on the left in FIG. 2, comprises a bore 138 on to one end of which the inlet orifice 126 enters, whereas its other end is provided, round the aperture 136, with a seat 140 for a first valve member 142 formed by a ball. The ball 142 is fixed to a piston 144 slidable in the bore 138 and urged into the position shown in FIG. 2 by a spring 146 supported against a cap 148, which is mounted at the left-hand end of the casing 112 and separates the inlet orifice 126 from the exhaust orifice 128. The control valve is shown in its idle position, in which the ball 142 bears on the seat 140. In this position, the left-hand end of the piston 144 reveals almost all of the passage between the bore 138 and the outlet orifice 124, so that fluid can flow freely between the pump 20 and the power-steering valve 22. To conclude this description of the left-hand portion of the control valve, the casing 112 contains a passage 150 providing a direct fluid connection between the inlet orifice 126 and the cavities 152, 154 on opposite sides of the cylinder 144.

The second compartment in the casing, situated on the right in FIG. 2, comprises a stepped bore housing tappet means for actuating the ball 142 and comprising a needle 176 and a piston 156. The smaller-diameter portion of the bore slidably receives the piston 156, separating a first cavity 158 connected by radial working orifices 160 to the working chamber 24 from a third compartment 162, into which the control rod 132 projects and which is connected by a longitudinal passage 164 (shown in part) to the exhaust orifice 128. The piston 156 is traversed by a longitudinal duct 166 of which one end leads by radial passages 168 to the cavity 158 and the other widens to define a seat 170 for a second valve member 172, formed by another ball which is urged directly by the control rod 132. The ball 172 can therefore control the flow between the working chamber 24 and the exhaust orifice 128. A weak return spring 174 lifts the ball 172 off the seat 170. Between the head of the piston 156 and the ball 142 the needle 176 is slidable in the central bore of a third valve member 178, which is frustoconical and of which the outer periphery slides in the casing 112 and contains longitudinal slots 180 to enable fluid to flow. Note that the aperture 136 is stepped, so that the effective area of the seat 140 is less than that of the seat 182 for the third valve member 178.

Note also that the three valve members 142, 172 and 178 and the moving parts of the control valve, the cylinder 144, the needle 176, the piston 156 and the control rod 132 are all coaxial with the bore 110 of a line XX'. The piston 156 and needle 176 thus define a tappet means for the valve member 142, but in a variant of the invention (not shown) they are rigidly connected.

The control valve just described operates as follows. In the idle position, the working chamber 24 is connected to the discharge orifice 128, the ball 172 being clear of its seat 170. Also, fluid from the pump 20 flows freely from the orifice 126 to the orifice 124. When braking occurs, the control rod 132 is urged to the left in FIG. 2, first closing the passage 166 and then moving the piston 156 and needle 176 so as to lift the ball 142 off its seat 140. The motion of the piston 144 to the left reduces the passage cross-section between the orifices 126 and 124. The pressure therefore rises in the cavities 152, 154 and 158. When the desired pressure is reached in the chamber 24, the rod 132 to the right in FIG. 2, and the spring 146 returns the piston 144 towards the seat 140. The pressure therefore falls in the cavities 152, 154. This pressure reduction draws the valve member 178 towards its seat 182 in which it closes a short time before the ball 142 bears on its seat 140. When the brakes are released, the control rod 132 moves still further to the right in the figure to enable the ball 172 to clear its seat.

It may be noted that in the embodiment of the invention here described the effective cross-sections of the push rod 132, of the seat 170 and of the piston 156 are equal. Under these circumstances, and apart from friction, the reaction force exerted on the push rod 132 results only from the return spring 146, the cylinder 144 being pressure-balanced.

The valve member 178 prevents the discharge of pressure fluid from the working chamber 24 to the power-steering circuit 22, whether during normal use of the hydraulic booster or during emergency use when the brake booster is associated with a pressure fluid accumulator which can be used when the principal pump 20 is defective. It is also possible to omit the valve member 178 in a braking installation comprising an emergency accumulator, but in this case the spring 146 must be stronger, to prevent the ball 142 from leaving its seat 140.

I claim:

1. A control valve for a hydraulic booster having an housing with a pressure chamber therein said valve comprising a casing containing first and second coaxial compartments separated by a radial partition and connected respectively to an inlet orifice and a working orifice, the radial partition having an aperture communicating with both compartments, said aperture opening into said first compartment by the intermediary of a first valve seat, a first valve member resiliently urged toward said seat, tappet means for controlling the said first valve member and having one end projecting through said aperture and the other end slidably mounted in said casing and separating said second compartment from a third compartment connected to an exhaust orifice, a duct traversing said other end and communicating said second and third compartments, said duct opening into said third compartment through the intermediary of a second valve seat, a second valve member in said third compartment to cooperate with said second seat, a control member projecting into said third compartment for successively seating said second valve member and unseating said first valve member through said tappet means, a piston slidably mounted in said first compartment and defining in said first compartment a first cavity and a second cavity, said piston having one face supporting said first valve member located in said first cavity and the other face acting as a closure spool to partly cover an outlet orifice opening into said second cavity, and a by-pass passage between said first and second cavities.

2. A control valve as claimed in claim 1, wherein the aperture in the partition is stepped and has a portion of smaller diameter adjoining said first seat and a portion of larger diameter adjoining the working orifice and defining a third valve seat for a third valve member coaxial with the first two valve members and slidable on the one end of the tappet.

3. A control valve as claimed in claim 2, wherein the third valve member is frustoconical and slides on the casing, slots being provided at the periphery of the third valve member to allow fluid to flow freely between the working orifice and the third seat.

4. A control valve as claimed in claim 1, wherein one end of the casing is adjacent to the said third compartment and is provided with an opening slidably receiving said control member.

5. A control valve as claimed in claim 4, wherein the third compartment is connected to the exhaust orifice by a longitudinal passage interconnected with the other end of the casing.

6. A control valve as claimed in claim 1, wherein said casing takes the form of a cartridge introduced in the wall of the booster housing separating said pressure chamber from outside, said cartridge comprising three peripheral bearing surfaces adapted to separate the inlet, outlet, exhaust and working orifices.

* * * * *